Jan. 30, 1940.  W. J. CLARK ET AL  2,188,830

POTENTIOMETER

Filed April 4, 1935  3 Sheets-Sheet 1

Inventors
William Jasper Clark
Claude Henry Bosanquet
Robert Arthur Bell
Rhys Matthews.

By Roy F. Steward
Attorney

Jan. 30, 1940.    W. J. CLARK ET AL    2,188,830
POTENTIOMETER
Filed April 4, 1935    3 Sheets-Sheet 2
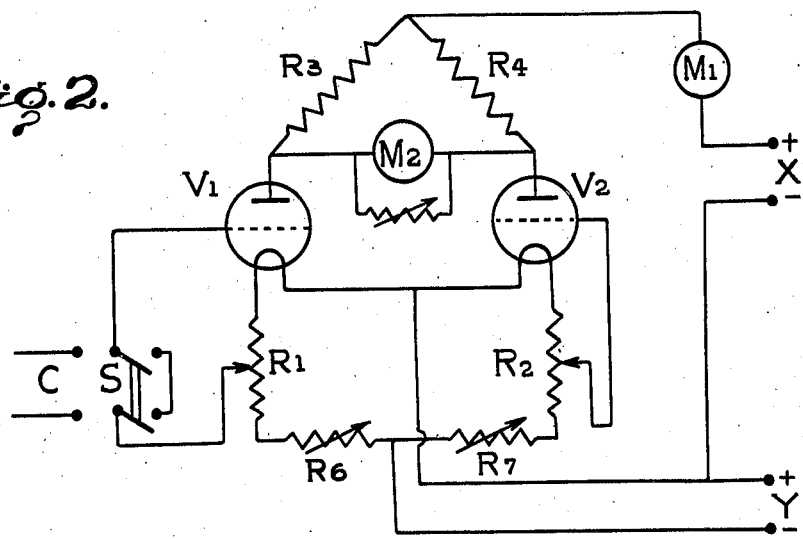
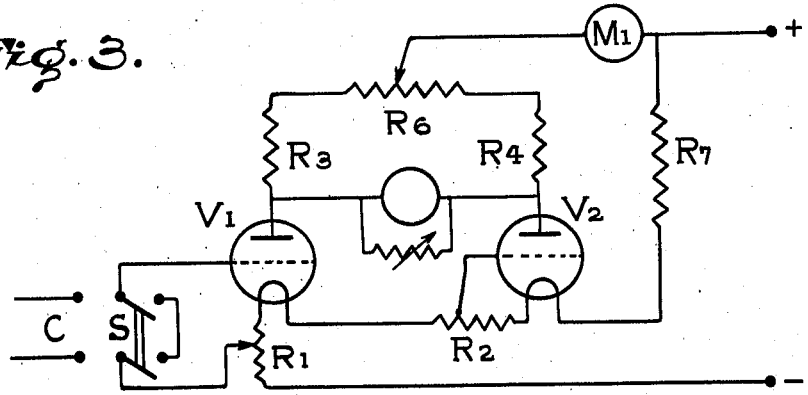
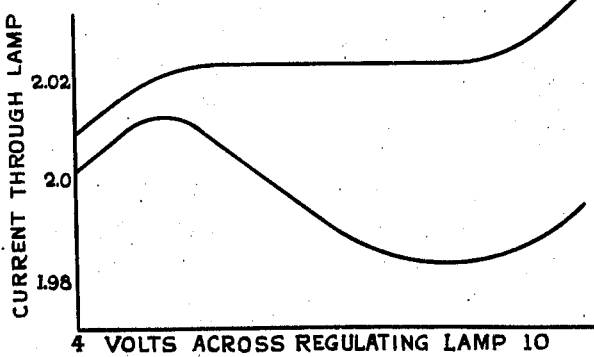
Inventors
William Jasper Clark
Claude Henry Bosanquet
Robert Arthur Bell
Rhys Matthews.
By Roy F. Steward
Attorney

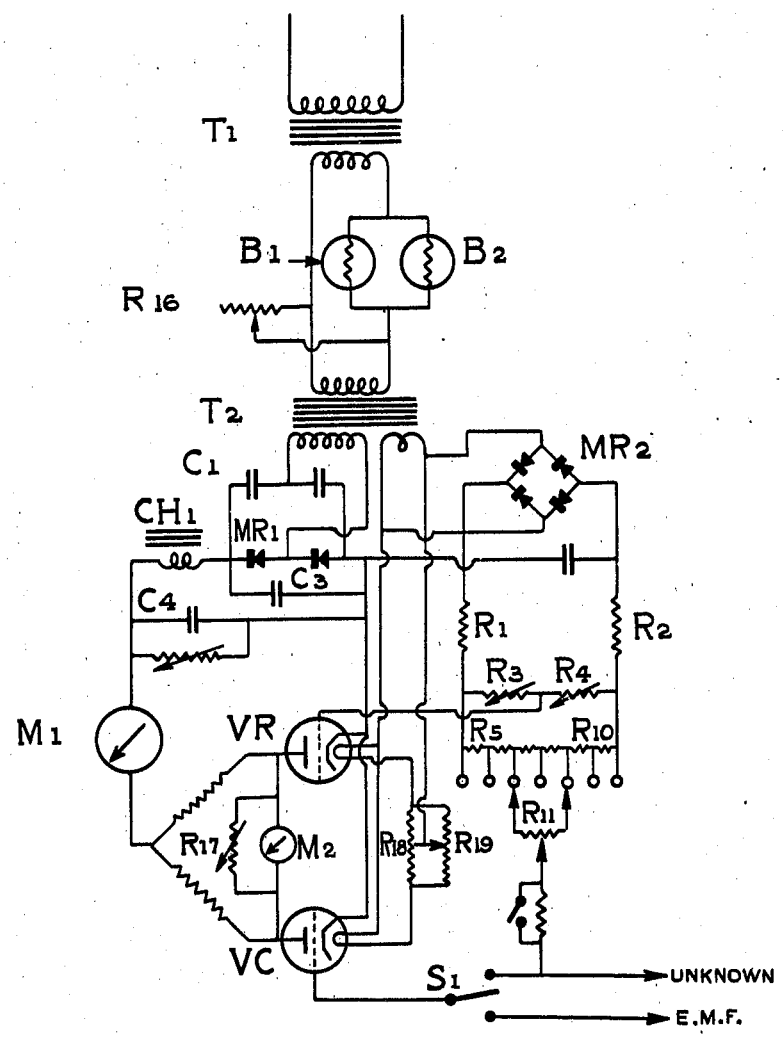

Patented Jan. 30, 1940

2,188,830

UNITED STATES PATENT OFFICE 2,188,830

POTENTIOMETER

William Jasper Clark, Claude Henry Bosanquet, Robert Arthur Bell, and Rhys Matthews, Norton-on-Tees, England, assignors to Imperial Chemical Industries Limited, a corporation of Great Britain Application April 4, 1935, Serial No. 14,704
In Great Britain April 20, 1934

1 Claim. (Cl. 175—183)

For certain applications it is necessary to measure small E. M. F.'s without drawing appreciable current from the sources of E. M. F., as for example, in the measurement of pH values.

For this purpose various forms of electrical circuits have been devised. One known type of circuit consists of a Wheatstone bridge in which two of the resistances are replaced by matched thermionic triode valves. The valves act as resistances, the values of which can be altered by changing the grid bias voltages of the valves, thereby altering the current reading of the galvanometer connected across the bridge. By choosing valves of very low grid current characteristics, using one valve as a reference valve with fixed grid bias, and applying the small E. M. F. it is desired to measure to the grid of the second valve, it follows that the current indicated by the galvanometer is a measure of this E. M. F.

Using the bridge circuit with matched valves, slight alterations in feed voltages, and possibly temperature effects, will affect both valves similarly, and hence the symmetry of the bridge in the balanced position is to a great extent unaffected.

The sensitivity of the circuit, i. e., the change in galvanometer current for a given change in grid bias is, however, still greatly dependent on the absolute values of feed voltages, which should be maintained as steady as possible.

A second type of circuit consists of a single battery operated triode valve, in which the current through a galvanometer in the plate circuit is counterbalanced by a form of Wheatstone bridge. Factors normally causing variations in the current through the galvanometer, such as changes in plate, filament, and grid voltages other than changes in grid voltage intentionally applied, are compensated for. As in the first type of circuit, the E. M. F. it is desired to measure is applied to the grid circuit of the valve, producing an out-of-balance current through the galvanometer, which can be interpreted in terms of grid E. M. F.

Both types of circuit, while capable of measuring small E. M. F.'s have only been applied in indicating instruments for use with batteries. These instruments are cumbersome and require considerable maintenance and attention owing to the necessity for charging and keeping the batteries in good condition. They also require a settling down period after battery charging before a steady reading is obtained, and in general they are not suitable for industrial service conditions.

The object of the present invention is to eliminate as far as possible maintenance troubles and to produce a robust, compact valve potentiometer operating entirely from either the A. C. or D. C. mains.

According to our invention we provide a potentiometer for measuring small E. M. F.'s comprising a Wheatstone bridge circuit including at least one thermionic triode valve acting as a resistance, means for applying an E. M. F. to the grid of said valve, both with and without the addition of the unknown E. M. F., and means for measuring the out of balance current across the Wheatstone bridge, said bridge being fed with direct current at approximately constant voltage by an A. C. current source through a circuit including a transformer, a rectifier and condenser and at least one current regulating device. The current regulating device is preferably a Baretter lamp and this may be shunted by a resistance of negligible temperature coefficient.

The Wheatstone bridge circuit may include a single thermionic triode valve, the filament circuit of which contains a resistance from which an E. M. F. may be tapped off to the grid of the valve, bearing a predetermined constant ratio to the total voltage applied across the bridge circuit. The said resistance is preferably made up of a resistance of positive temperature coefficient placed near the valve and a further resistance of negligible temperature coefficient. A battery of constant E. M. F. may be included in the grid circuit.

Alternatively, the Wheatstone bridge circuit may include a pair of thermionic valves, one on each side of the bridge, and in this case separate smoothing circuits are preferably provided for the current supply to the bridge and to the filaments of the valves respectively. A separate smoothing circuit may also be provided for supplying E. M. F.'s of approximately predetermined magnitude to the grids of the valves. Alternatively the filament circuits may contain resistances from which E. M. F.'s of approximately constant magnitude are tapped off to the grids of the valves.

Some applications of the invention are illustrated diagrammatically in the accompanying drawings wherein Fig. 1 is a circuit diagram illustrating one practical embodiment of the invention wherein the bridge circuit consists of two matched valves in series, respectively, with two resistances;

Fig. 2 is a circuit diagram of another embodiment of the invention involving the use of two instead of three smoothing circuits;

Fig. 3 is a circuit diagram of still another embodiment wherein one rectifying circuit is used, the filaments of the two valves being connected in series with the common H. T. supply to the valves;

Figure 1:
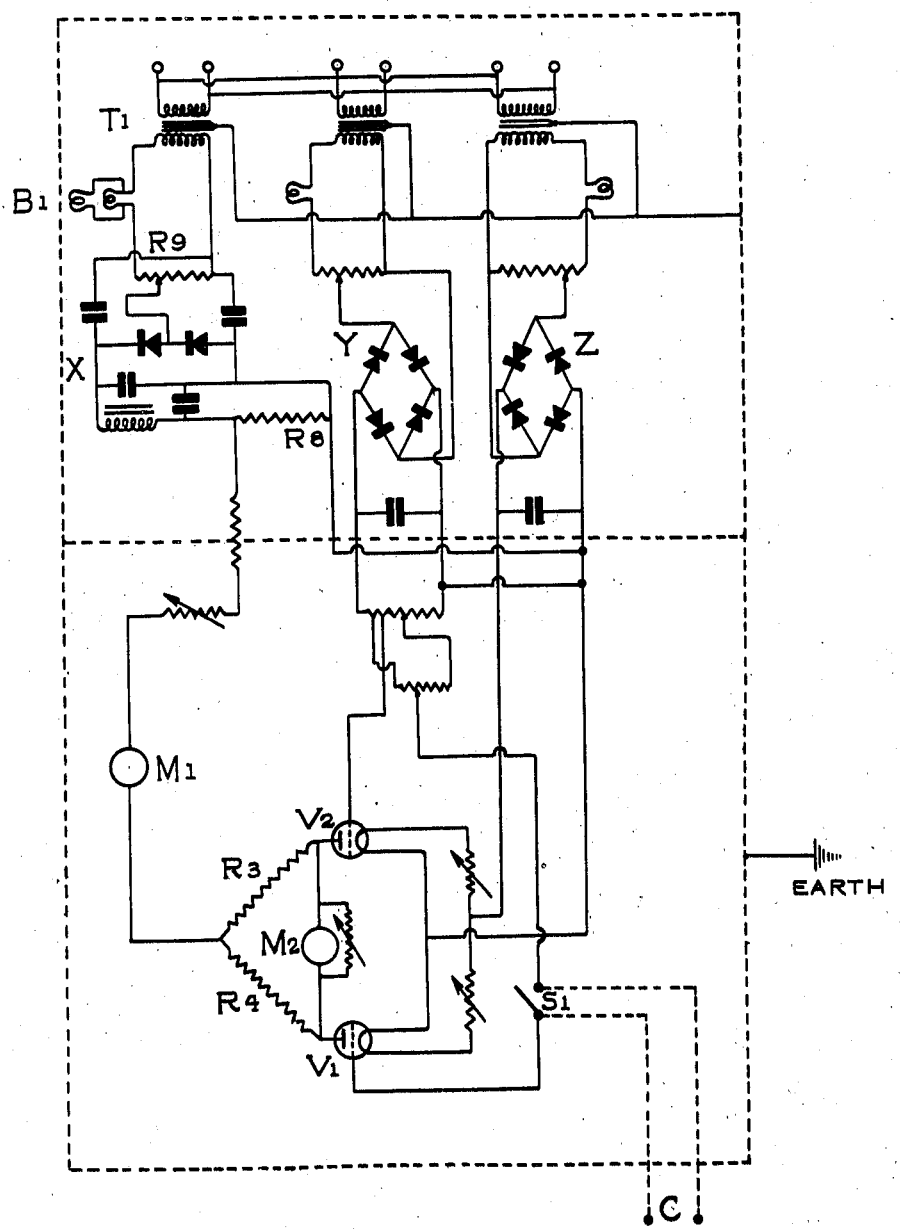

Fig. 4 comprises curves showing graphically how the use of compensating resistances across the Baretter lamps improves their compensating characteristics; and Fig. 5 illustrates diagrammatically another circuit arrangement within the invention wherein the filament heating current and grid bias E. M. F. are both supplied from the same winding of a split-secondary transformer.

Features of importance, some of which are not shown in the drawings, are—

(a) The spacing of components to allow of adequate ventilation. All parts producing heat are transferred to one side of the apparatus and screened from the remainder with a heat insulating screen and are spaced to be accessible and to ensure that overheating does not take place.

(b) The method of assembly to avoid intersection of the various electrical circuits.

(c) The use of voltage-compensated rectified current circuits to make the performance of the potentiometer very little dependent on mains variation over a wide range of voltage.

(d) The use of a special oil immersed potentiometer to eliminate troubles due to faulty bias contacts.

Referring to Fig. 1, the bridge circuit consists of two matched valves $V_1$ and $V_2$ in series respectively with two resistances $R_4$ and $R_3$.

A shunted thread recorder $M_2$ records the out-of-balance current produced between the plates of the valves due to variation in the source of E. M. F. C it is desired to measure. Switch $S_1$ enables the source of E. M. F. to be included or cut out of the grid circuit of valve $V_1$ at will.

The high tension feed to the bridge is supplied by rectifier circuit X, in which the A. C. supply via transformer $T_1$ is regulated by Baretter lamp $B_1$ to give a constant current through this circuit and an almost constant A. C. voltage across resistance $R_9$. In this specification the term "Baretter lamp" is used to indicate a regulating lamp having the characteristic that the rate of change of current with voltage is negligible over a considerable range of voltages.

A standard rectifying circuit consisting of metal rectifiers, condensers and chokes, then supplies an almost constant E. M. F. across $R_8$ which, being small compared with the effective resistance of the bridge circuit, enables a voltage to be maintained across the bridge which is, for all practical purposes, independent of slight variations in the bridge resistance. Milliameter $M_1$ indicates the total bridge current and serves as a check on the correct working of the potentiometer.

Rectifier circuits Y and Z supply, in a similar way, voltage compensated feeds for the grid biases and valve filaments respectively.

In the case of D. C. mains, it is necessary to transform to A. C. of suitable voltage and frequency, for example, by means of a rotary converter, prior to applying this circuit.

Several variations of the above circuit are included in this invention:

(I) The use of two instead of three smoothing circuits. A diagrammatic illustration of this circuit is shown in Fig. 2.

(II) The use of one rectifying circuit, the filaments of the two valves being connected in series with the common H. T. supply to the valves. A circuit in accordance with this principle is shown in Fig. 3.

(III) The use of a single mains transformer, the secondary of which feeds the primary of a second transformer and includes Baretter resistances, and the secondary windings of the second transformer feeding the potentiometer section.

(IV) The employment of Baretter regulating lamps after instead of before the rectifiers to each circuit thereby compensating for any variation in feed supply due to variation in rectifier characteristics.

(V) The use of voltage compensated rectifying circuits using valve rectifiers in place of metal rectifiers.

(VI) The use of compensating resistances across Baretter lamps to improve their current compensating characteristics. This feature will be explained in further detail with reference to Fig. 4.

Referring now to Fig. 2, the rectification and smoothing portions of the instrument are exactly similar to those in the former arrangement, except that rectifier Z is omitted, together with its transformer and regulating lamp.

The grid bias E. M. F. is provided by the potentiometers $R_1$ and $R_2$, which are in series with the filaments of valves $V_1$ and $V_2$. The filament current is supplied by rectifier Y and the currents are regulated by means of $R_6$ and $R_7$. The other symbols have the same significance as in Fig. 1.

If $R_2$ and $R_7$ are then fixed for any setting of $R_6$ the instrument can be balanced with $R_1$, but the change of current in $V_1$ due to change of voltage at Y will depend on the setting of $R_6$. It is, therefore, possible to find a setting of $R_6$ and $R_1$ such that any variation of voltage at Y will affect both valves equally and give a stable zero independent of exact matching of the valves.

In the arrangement shown in Fig. 3 the current from the H. T. source passes through the filaments, resistances $R_1$ and $R_2$ and the high resistance $R_7$ in series. The grid bias is provided by the tapping $R_1$ and $R_2$ and the anode voltage by the voltage drop across $R_7$. $R_6$ is a slide wire which controls the ratio of the currents through the two valves. The other symbols have their previous significance.

With this arrangement, if $R_2$ is fixed for any position of $R_6$, the zero can be adjusted with $R_1$. For varying positions of $R_6$ the relative responses of the two valves to changes in the H. T. potential will vary; hence it is possible to find a setting of $R_6$ and $R_1$ which will render the zero of the instrument independent of the H. T. potential and independent of exact matching of the two valves.

In Fig. 4, curve I shows the relationship between voltage across, and current through, a typical Baretter lamp. By shunting the Baretter with a manganin resistance of suitable value, it is possible to improve the current voltage relationship to that shown by curve II.

In another form of the circuit, as shown in Fig. 5, the filament heating current and grid bias E. M. F. are both supplied from the same winding of the split-secondary transformer $T_2$. No rectifier is required for the heating circuit since the filaments are indirectly heated, and the relation between the heating currents for the two valves is controlled by the potentiometer $R_{18}$ and $R_{19}$. Rectified current for the grid bias potentiometer $R_1$ to $R_{11}$ is supplied through the rectifier $MR_2$.

Current for the bridge circuit is supplied by the other secondary winding of $T_2$ together with the necessary rectifier $MR_1$, choke $CH_1$ and condensers $C_1$, $C_2$, $C_3$ and $C_4$.

Current is supplied to the primary of $T_2$ by the transformer $T_1$, the current from which is rendered constant by means of the Baretter lamps $B_1$, $B_2$, the supply to the primary of $T_2$ being controlled by the variable shunt $R_{16}$.

It will be seen that if switch $S_1$ be moved counter-clockwise, then for any setting of the filament currents by means of $R_{18}$, $R_{19}$ the indicator can be brought to zero by adjustments of $R_5$ to $R_{11}$. The correct setting is obtained when the zero is unaffected by slight variations of the variable shunt $R_{16}$.

The sensitivity of the instrument is controlled by the variable shunt $R_{17}$ across the recording instrument $M_2$.

The valves VC, VR are of the alternating current type and are of high mutual conductance, constant characteristics, and very low grid current of the order of 1 milli-micro amps.

In a further form of this circuit a portion of the current in the intermediate circuit between the two transformers is shunted through the heaters for the indirectly heated cathodes of the valves. In this case rectifier $MR_2$ is eliminated and current for the grid bias potentiometer is drawn from the high tension D. C. supplied by $MR_1$ through suitable high resistances.

We claim:

A system for determining pH values by the measurement of small E. M. F.'s comprising in combination a Wheatstone bridge circuit, means for measuring the unbalanced current across the bridge, and a pair of thermionic triode valves, one on each side of the bridge; means for appplying an approximately constant E. M. F. to each valve grid; means for adjusting the filament currents of the valves to balance the valve plate currents; means for applying the potential difference between the electrodes to the grid of one valve; and means for feeding said bridge and valves with direct current at approximately constant voltage from an A. C. current source comprising a circuit including said A. C. current source, a transformer, a rectifier and condenser and at least one current regulating device.

WILLIAM JASPER CLARK.
CLAUDE HENRY BOSANQUET.
ROBERT ARTHUR BELL.
RHYS MATTHEWS.